(12) United States Patent
Prager et al.

(10) Patent No.: US 7,363,313 B2
(45) Date of Patent: Apr. 22, 2008

(54) METHOD, SYSTEM, AND PROGRAM PRODUCT FOR REBASING AN APPLICATION

(75) Inventors: Scott H. Prager, Stratham, NH (US); Gary P. Rheaume, Barrington, NH (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 10/636,417

(22) Filed: Aug. 7, 2003

(65) Prior Publication Data

US 2005/0033752 A1    Feb. 10, 2005

(51) Int. Cl.
  *G06F 17/00*   (2006.01)
(52) U.S. Cl. .................... 707/102; 707/200
(58) Field of Classification Search ............. 707/100, 707/102

See application file for complete search history.

(56) References Cited

U.S. PATENT DOCUMENTS

| | | | |
|---|---|---|---|
| 5,097,533 A * | 3/1992 | Burger et al. ............... | 719/328 |
| 5,566,330 A | 10/1996 | Sheffield | |
| 5,754,845 A | 5/1998 | White | |
| 5,764,977 A | 6/1998 | Oulid-Aissa et al. | |
| 5,765,039 A | 6/1998 | Johnson | |
| 5,765,172 A * | 6/1998 | Fox ............................ | 707/204 |
| 5,787,433 A * | 7/1998 | Plotkin et al. ............... | 707/101 |
| 5,809,497 A | 9/1998 | Freund et al. | |
| 5,857,197 A | 1/1999 | Mullins | |
| 5,901,313 A | 5/1999 | Wolf et al. | |
| 5,950,190 A | 9/1999 | Yeager et al. | |
| 6,073,173 A * | 6/2000 | Bittinger et al. ............ | 709/224 |
| 6,157,928 A * | 12/2000 | Sprenger et al. ............ | 707/103 R |
| 6,324,547 B1 | 11/2001 | Lennert et al. | |
| 6,473,765 B1 | 10/2002 | Fink | |
| 6,915,287 B1 * | 7/2005 | Felsted et al. ............... | 707/1 |
| 2001/0018690 A1 * | 8/2001 | Tung Ng et al. ........ | 707/103 Y |
| 2002/0053000 A1 | 5/2002 | Wakai et al. | |
| 2002/0161734 A1 | 10/2002 | Stauber et al. | |
| 2002/0194357 A1 | 12/2002 | Harris et al. | |
| 2002/0198891 A1 | 12/2002 | Li et al. | |
| 2003/0033317 A1 | 2/2003 | Ziglin | |
| 2005/0015407 A1 * | 1/2005 | Nguyen et al. ............. | 707/200 |

FOREIGN PATENT DOCUMENTS

WO     WO 97/04407     2/1997

OTHER PUBLICATIONS

Maloney, T., IEEE, 1993, pp. 229-233.*
Bialek, B., Abstract of "Infiniband opens the throttle," DB2 Magazine, vol. 7 No. 1, pp. 30-32, 34-35, Publication date 2002.
Riemersma, T., Abstract of "Rebasing WIN32 DLLS," Windows Developers Journal, vol. 11 No. 12, pp. 26-33, Dec. 2000.
Filho et al., Abstract of "Evolving a Legacy Data Warehouse System to an Object-Oriented Architecture," Proceedings of the 20th International Conference of the Chilean Computer Science Society, Nov. 16-18, 2000, pp. 32-40.

(Continued)

*Primary Examiner*—Cheyne D. Ly
(74) *Attorney, Agent, or Firm*—John E. Pivnichny; Hoffman, Warnick & D'Alessandro LLC

(57) ABSTRACT

Method, system, and program product for rebasing an application. The application is analyzed to identify the database components that require remapping to a new database. These components are remapped to utilize the new database and/or a new interface layer that utilizes the new database. The components can be remapped by rewriting the component and/or redirecting the component. However, the configuration that is used for the data in memory is maintained, thereby reducing the number of components in the application that require modification.

12 Claims, 5 Drawing Sheets

OTHER PUBLICATIONS

Post et al., "Dynamically Configurable User Interface for the Manipulation of Data Objects," IBM Technical Disclosure Bulletin, vol. 37 No. 03, Mar. 1994, pp. 23-30.
Abstract of Patent No. WO 200265286, Aug. 8, 2002, PCT.
Blakely-Fogel et al., Abstract of "Generic Database Interface," Research Disclosure # 318, Oct. 1990.
Abstract of RD 318002, Oct. 1990.

* cited by examiner

METHOD, SYSTEM, AND PROGRAM PRODUCT FOR REBASING AN APPLICATION

BACKGROUND OF THE INVENTION

1. Technical Field

The invention relates generally to rebasing a software application, and more specifically, to a solution for remapping a component/module of an application from an internal proprietary database to a new database.

2. Related Art

The trend in recent years has been for data to be shared by many software applications. As a result, data is now frequently stored in databases that use an "open" standard to perform operations on the data. An open standard is a publicly known way of storing and/or accessing data. The use of an open standard allows several applications to both implement functions and access data stored using the open standard. A commonly used open standard for interacting with a database is the Structured Query Language (SQL).

Unfortunately, many popular software applications were implemented using proprietary systems for storing and accessing data. In light of the recent trend, consumers are increasingly expecting that these applications also be able to share data with other applications. Additionally, administrators seek to reduce costs by having fewer backend systems that require administration, backup, etc. However, these applications are frequently tightly coupled to the proprietary data storage systems. Further, it is often not economical and/or desirable to rewrite these applications in their entirety. As a result, there is a need to "rebase" these applications from the proprietary data storage system to an open data storage system. Rebasing keeps the application the same from a user's perspective, while changing the underlying data storage system. When an application is tightly coupled to the proprietary data storage scheme, rebasing the application can be difficult. Because of this, current rebasing operations frequently result in new incompatibilities and software glitches, high costs, and may result in an inability to exploit useful features of the open data storage system.

As a result, a need exists for a solution for economically and reliably rebasing an application. In particular, a need exists for a method, system, and program product that simplify the rebasing operation and reduce the changes that are required to rebase the application.

SUMMARY OF THE INVENTION

In general, the invention provides a method, system, and program product for rebasing an application from an internal, proprietary database to a new database (which could be internal or external). Specifically, under the present invention, the application is analyzed to identify database components/modules that will require modification during the rebasing operation. A new database schema is defined that will be used to store the application data. The database components that require it are then remapped to utilize the new database and/or a new interface layer that utilizes the new database. Typically, a database component can be remapped by rewriting the component and/or redirecting the data to the new database. However, the configuration used to store application data in memory when it is used by the remainder of the application is maintained. This allows for a reduced number of modifications that are required to rebase the application, thereby limiting the inadvertent introduction of new software bugs and/or incompatibilities with the previous version of the application as well as a lower development cost.

A first aspect of the invention provides a method of rebasing an application, the method comprising: identifying an interface layer of the application that manages application data using a configuration of the application data; identifying a database component in the interface layer that utilizes a first database that stores the application data; defining a second database to store at least some of the application data; and remapping the database component to utilize the second database, wherein the configuration is maintained.

A second aspect of the invention provides a method of rebasing an application, the method comprising: identifying a first interface layer of the application that manages application data using a configuration of the application data; identifying a database component in the first interface layer that utilizes a first database that stores the application data; defining a second database to store at least some of the application data; adding a second interface layer that utilizes the second database; and remapping the database component to utilize the second interface layer, wherein the configuration is maintained.

A third aspect of the invention provides a system for rebasing an application, the system comprising: an analysis system for identifying an interface layer of the application that manages application data using a configuration of the application data, and for identifying a database component in the interface layer that utilizes a first database that stores the application data; a database schema system for defining a second database to store at least some of the application data; and a remapping system for remapping the database component to utilize the second database, wherein the configuration is maintained.

A fourth aspect of the invention provides a program product stored on a recordable medium for rebasing an application, which when executed comprises: program code for identifying an interface layer of the application that manages application data using a configuration of the application data, and for identifying a database component in the interface layer that utilizes a first database that stores the application data; program code for defining a second database to store at least some of the application data; program code for adding a second interface layer that utilizes the second database; and program code for remapping the database component to utilize the second interface layer, wherein the configuration is maintained.

BRIEF DESCRIPTION OF THE DRAWINGS

These and other features of this invention will be more readily understood from the following detailed description of the various aspects of the invention taken in conjunction with the accompanying drawings in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a method, system, and program product for rebasing an application from an internal, proprietary database to a new database (which could be internal or external). Specifically, under the present invention, the application is analyzed to identify database components/modules that will require modification during the rebasing operation. A new database schema is defined that will be used to store the application data. The database components that require it are then remapped to utilize the new database and/or a new interface layer that utilizes the new database. Typically, a database component can be remapped by rewriting the component and/or redirecting the data to the new database. However, the configuration used to store application data in memory when it is used by the remainder of the application is maintained. This allows for a reduced number of modifications that are required to rebase the application, thereby limiting the inadvertent introduction of new software bugs and/or incompatibilities with the previous version of the application.

Figure 1:
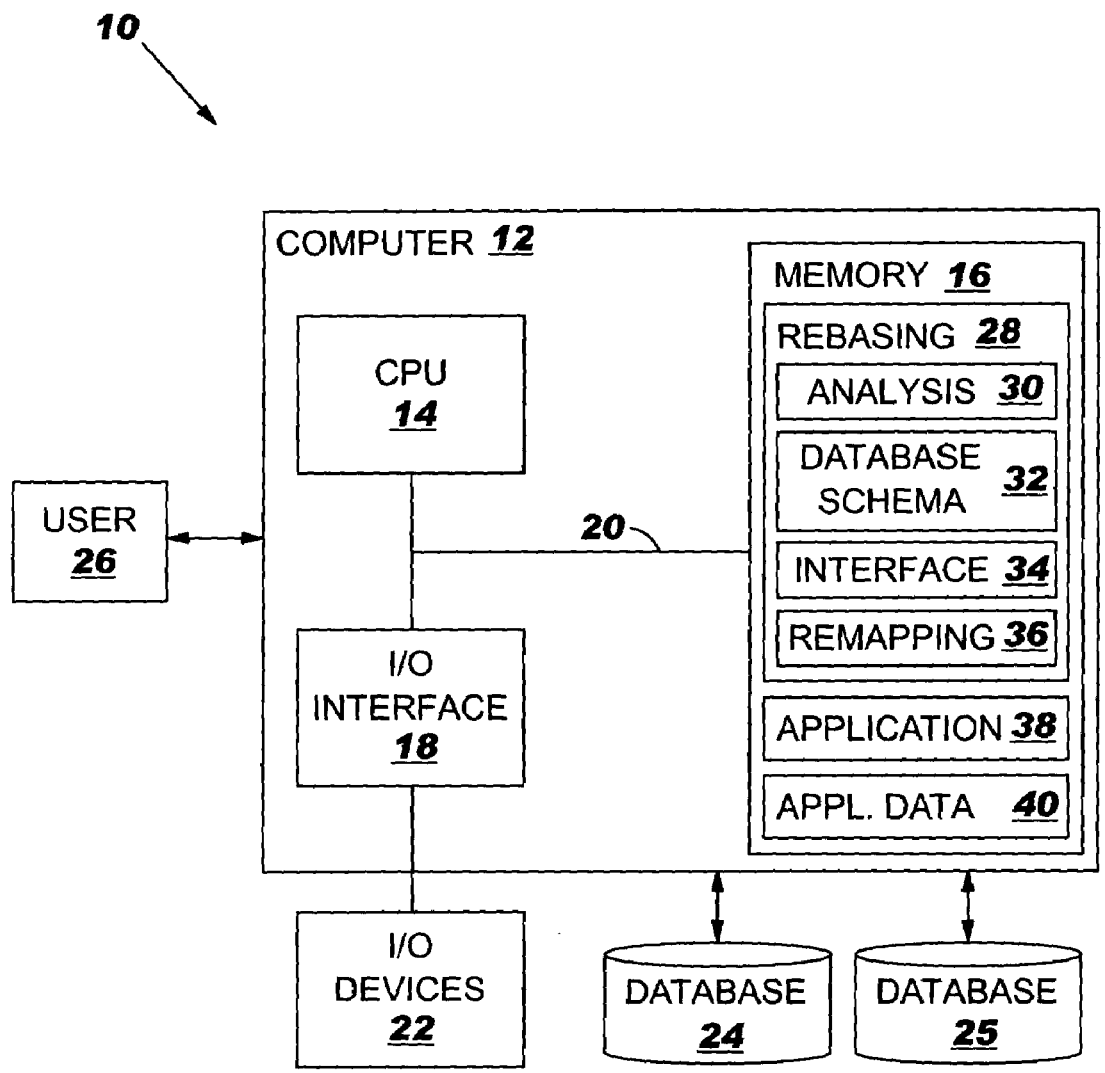
FIG. 1 shows an illustrative system according to one aspect of the invention.

Turning to the drawings, FIG. 1 shows an illustrative system 10 according to one embodiment of the invention. System 10 rebases an application 38 from an old database 24 to a new database 25 as described in more detail below. As shown, system 10 includes a computer 12 that generally includes central processing unit (CPU) 14, memory 16, input/output (I/O) interface 18, bus 20, external I/O devices/resources 22, and a database 24. Computer 12 can comprise any type of computing device. For example, computer 12 can comprise a server, a desktop computer, a laptop, a handheld device, a mobile phone, a pager, a personal data assistant, etc. It is understood, however, that if computer 12 is a handheld device or the like, the display could be contained within computer 12, and not as an external I/O device 22 as shown.

CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Database 24 may comprise any type of data storage for providing more static storage of data used in the present invention. As such, database 24 may include one or more storage devices, such as a magnetic disk drive or an optical disk drive. Moreover, similar to CPU 14, memory 16 and/or database 24 may reside at a single physical location, comprising one or more types of data storage, or be distributed across a plurality of physical systems in various forms.

Further, CPU 14, memory 16, and/or storage unit 24 can be distributed across a network (not shown). The network can comprise any type of network, including the Internet, a wide area network (WAN), a local area network (LAN), a virtual private network (VPN), a storage area network (SAN), etc. To this extent, communication over the network can occur via a direct hardwired connection (e.g., serial port), or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

I/O interface 18 may comprise any system for exchanging information to/from one or more I/O devices 22. I/O devices 22 may comprise any known type of external device, including speakers, a CRT, LED screen, handheld device, keyboard, mouse, voice recognition system, speech output system, printer, monitor/display, facsimile, pager, etc. Bus 20 provides a communication link between each of the components in computer 12 and likewise may comprise any known type of transmission link, including electrical, optical, wireless, etc. In addition, although not shown, additional components, such as cache memory, communication systems, system software, etc., may be incorporated into computer 12.

Shown in memory 16 are a rebasing system 28, an application 38, and application data 40. Application 38 utilizes database 24 to store data. When data is required by application 38, it retrieves the data from database 24 and stores it in memory 16 as application data 40. Application 38 may then perform operations on the data that are subsequently written to database 24. Rebasing system 28 analyzes and remaps "components" of application 38 to utilize a different database 25. In order to do this, rebasing system 28 is shown including an analysis system 30, a database system 32, an interface system 34, and a remapping system 36. Operation of each of these systems is described below. It is understood in advance that the term "component" is used to refer to a group of related software code. A component can be a function, an object in an object-oriented program, a library of functions, an executable program, etc.

Figure 2:
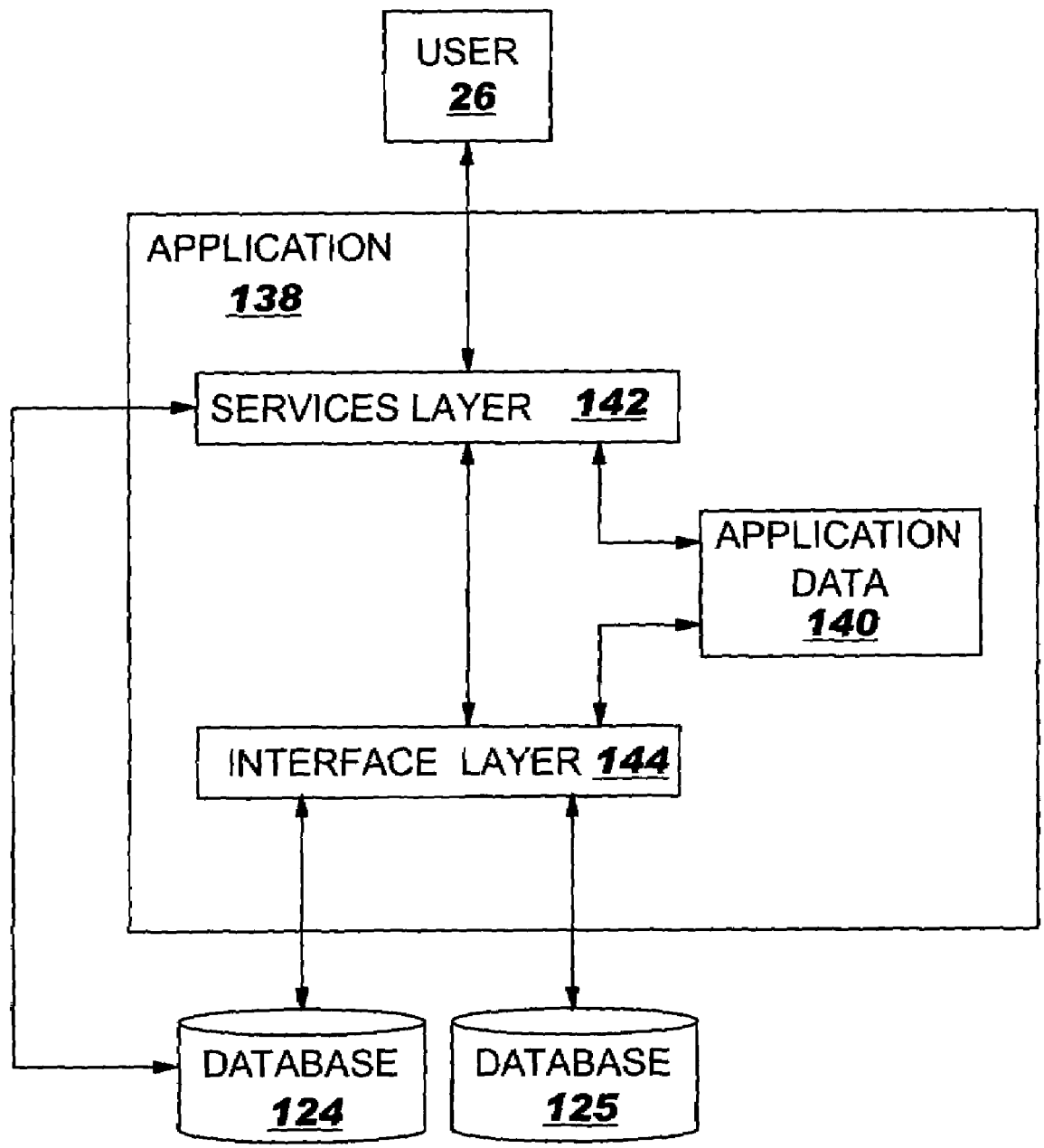
FIG. 2 shows an illustrative application that can be rebased according to another aspect of the invention.

FIG. 2 shows an illustrative application 138 that can be rebased using the invention. Application 138 includes a services layer 142 and an interface layer 144. Services layer 142 implements the various services of application 138. For example, services layer 142 can include components that provide a user interface that allows user 26 to utilize application 138. Further, services layer 142 can include components that communicate with other computers. In any event, services layer 142 adds, modifies, and deletes application data 140 based on the implemented services.

In order to effect changes to application data 140, services layer 142 can include components that interact with interface layer 144. Interface layer 144 manages application data 140 using a particular configuration. A configuration comprises the way that data is laid out in memory. For example, a list of contacts can be stored in memory as an array of contacts, a linked list of contacts, etc. Further, each contact can include one or more fields of information. For each contact, the fields may comprise, for example, fields for a name, an address, a city, a state, a zip code, and a phone number.

When a component in services layer 142 requires the retrieval of application data 140 from database 124, the component can "call" a component in interface layer 144 to perform this function. Interface layer 144 includes components that translate data between the configuration of application data 140 and database 124. To this extent, interface layer 144 stores application data 140 in database 124, and loads application data 140 into memory 16 (FIG. 1) from database 124. Similar to database 24, database 124 represents any system for managing data on a storage device (e.g., hard disk, tape, CD-ROM, etc.). For example, database 124 can be an internal, proprietary database system (e.g., DB2), a proprietary file, etc. Regardless, interface layer 144 includes one or more database components that utilize database 124. For example, interface layer 144 can include database component(s) for adding, modifying, and deleting entries in database 124 based on application data 140. Further, interface layer 144 can include database component(s) that update application data 140 based on database 124.

In the present invention, application 138 can be rebased to use another database (e.g., database 125). To this extent, rebasing system 28 (FIG. 1) is shown including an analysis system 30 (FIG. 1) that identifies one or more database components in interface layer 144. In order to identify a database component in interface layer 144, rebasing system 28 can first identify all components in application 138. Subsequently, rebasing system 28 can analyze each component and place it within services layer 142 or interface layer 144 according to the functionality that it provides. For example, components that include program code to utilize database 124 can be placed in interface layer 144, while components that interact with user 26 can be placed in services layer 142. While ideally, each component in application 138 can be placed in either services layer 142 or interface layer 144, a database component may also implement services. In this case, rebasing system 28 can place the database component in services layer 142 and mark it for further analysis.

In order to rebase application 138, a schema representing a data format for second database 125 must be defined. To this extent, rebasing system 28 (FIG. 1) is shown including a database schema system 32 (FIG. 1). Database schema system 32 defines the second database 125 that will store at least some of application data 140 instead of database 124. The second database 125 can be defined based on an improved storage scheme, a schema of database 124, application 138, and/or the requirements of other applications. When the second database 125 is at least partially based on application 138, database schema system 32 can analyze services layer 142 to determine, for example, its functionality and performance requirements. Based on these requirements, a schema for the second database 125 can be defined.

When rebasing application 138, one or more database components is remapped to utilize the second database 125 via remapping system 36 (FIG. 1). However, in order to reduce the amount of changes required (and thereby reduce the cost, potential for bugs, etc.), the configuration of application data 140 is maintained. Further, the programmatic interfaces used between services layer 142 and interface layer 144 remain the same, or substantially the same. As a result, all or nearly all components in services layer 142 will not require modification. In a typical application, services layer 142 comprises a substantial percentage of the software code. As a result, rebasing system 28 (FIG. 1) reduces the amount of changes required to rebase application 138.

In general, a database component can be remapped using one of several alternatives. For example, the database component can be rewritten, redirected to use the second database 125, or some combination of the two. Further, one or more database components may be combined or split up to provide the desired functionality. Rewriting a database component allows the new database component to increase the benefit obtained by using the second database 125 by leveraging the capabilities of second database 125, adopting a more advanced schema, and/or incorporating substantial differences between the databases. In this case, the new database component is newly developed in its entirety, disregarding the previous database component. However, rewriting the database component also requires the most work, and is more likely to create new bugs/incompatibilities.

While redirecting the database component to use the second database is easier to implement, it affords the least amount of opportunity to benefit from any advantages in using the second database 125. In this case, the database component is only changed to read/write to a new location. As a result, the data format(s) and method(s) implemented by the database component are maintained. Redirecting the database component can be performed at a lower cost, and is easier and safer due to the relatively fewer changes required. It may often be selected for relatively simple objects. Many database components may benefit from a combination of rewriting and redirecting. In addition, as will be further described below in conjunction with FIG. 3, a new interface layer could be defined via interface system 34 of FIG. 1. Database components could be remapped to this new interface layer instead of to the second database 125 itself.

Figure 3:
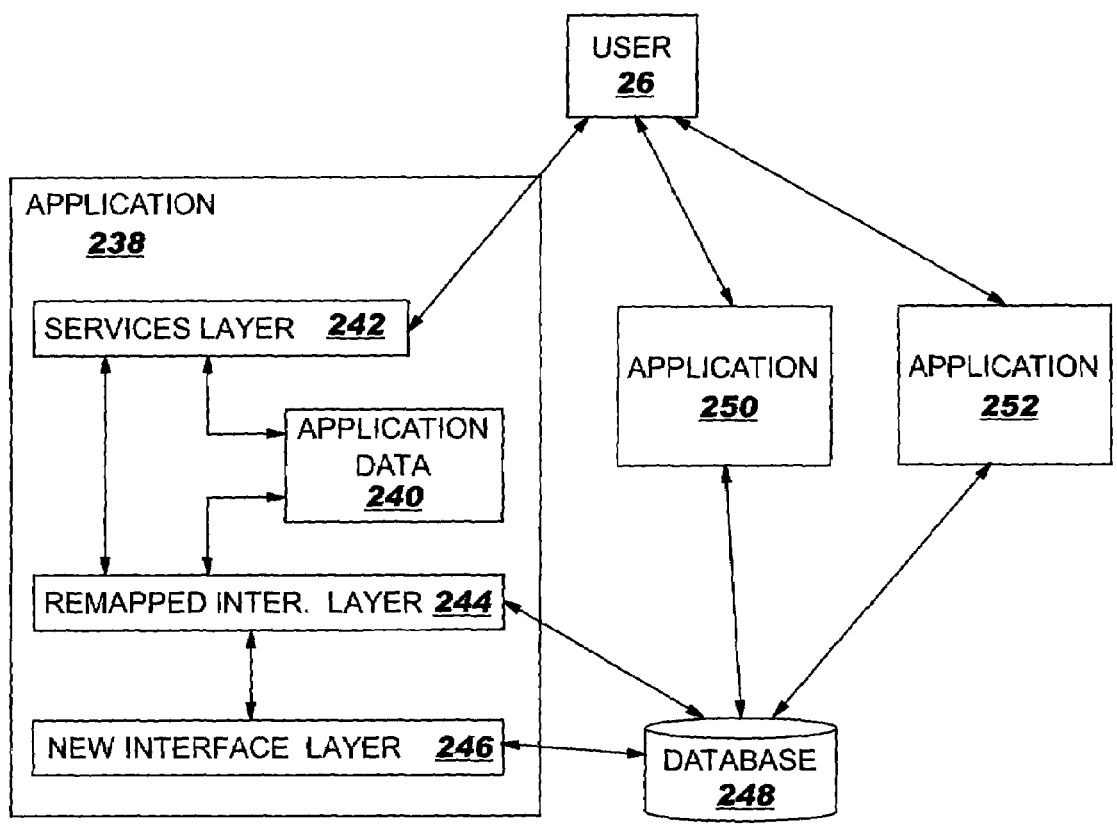
FIG. 3 shows an illustrative system after the application has been rebased according to yet another aspect of the invention.

FIG. 3 shows an illustrative system that includes application 238, which represents application 138 after rebasing. As shown, database 124 (FIG. 2) has been replaced by a second database 248. It is understood, however, that application 238 could continue to use database 124 along with second database 248. In either case, the configuration of application data 240 is maintained from the configuration of application data 140 (FIG. 2). Database 248 comprises an "open database" that allows one or more applications 250, 252 in addition to application 238 to access data stored in database 248. As a result of the rebasing, application 238 now comprises a services layer 242 and a remapped interface layer 244. Database components in remapped interface layer 244 now utilize database 248 and/or a new interface layer 246.

New interface layer 246 allows application 238 to more beneficially utilize second database 248. To this extent, rebasing system 28 (FIG. 1) can further include an interface system 34 (FIG. 1) to add new interface layer 246 to application 238. As discussed above, a database component can be remapped to utilize second database 248, or one or more components in new interface layer 246 that utilize second database 248. In one embodiment, at least one database component in remapped interface layer 244 utilizes second database 248, and at least one other database component in remapped interface layer 244 utilizes new interface layer 246. By implementing new interface layer 246, some isolation from database 248 is provided for remapped interface layer 244 and services layer 242. This isolation improves the modularity of application 238, and allows new interface layer 246 to manage aspects of second database 248, such as its schema and metadata. For example, new interface layer 246 can create, manage, and delete objects as required by second database 248. Further, new interface layer 246 can include a connection component for managing a connection to second database 248. For example, pooling or other mechanisms can be used to allow applications 238, 250, 252 to simultaneously access second database 248 and/or optimize the interaction between application 238 and second database 248. The connection component can manage the functions required to utilize pooling or the like.

Due to poor programming practices or the like, a component may implement functionality that would classify the component in both services layer 142 and interface layer 144. As shown and discussed above in conjunction with FIG. 2, these components can be included in services layer 142 and marked for further processing. Alternatively, these components can be included in interface layer 144. In either case, several options exist for processing these components. For example, during rebasing, a component can be rewritten so that it is properly placed in services layer 242 and utilizes interface layer 244, remapped to utilize second database 248, and/or remapped to utilize new interface layer 246. Further, one or more components in services layer 242 and/or remapped interface layer 244 can be enhanced with new features that take advantage of new interface layer 246 and/or second database 248. To this extent, it is understood that rebasing application 238 may include, in addition to remapping components, adding and/or deleting one or more components from the layers.

Figure 4:
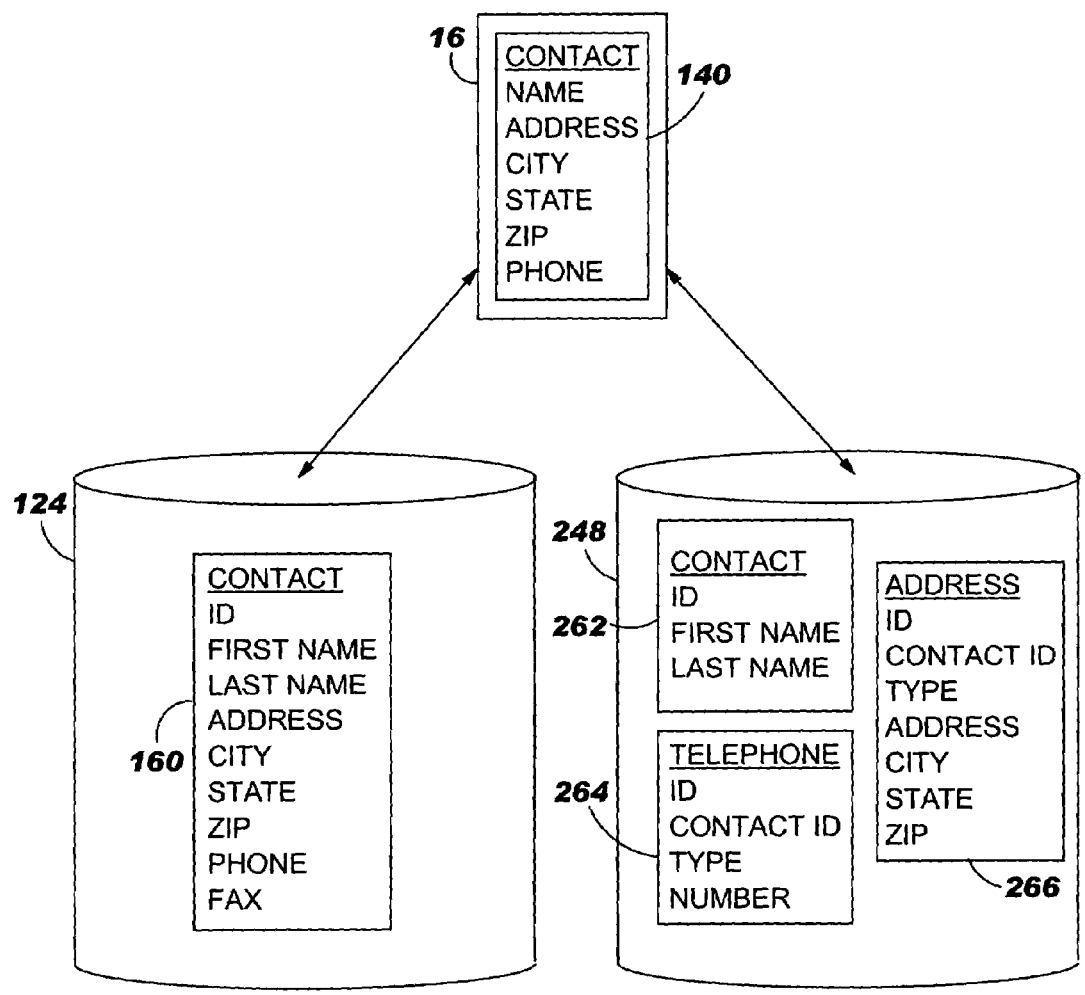
FIG. 4 shows illustrative database schemas according to still another aspect of the invention.

FIG. 4 shows illustrative database schemas according to one aspect of the invention. As discussed above, application data 140 (e.g., a contact) can be stored in memory 16 (FIG. 1) using a particular configuration. When application data 140 is stored in database 124, it may use a database schema that is different than the configuration used in memory 16. As shown, data for the contact is stored in database 124 as a record in a table 160 that includes fields for a record id, a first name, a last name, an address, a city, a state, a zip code, a phone number, and a fax number. As a result, interface layer 144 (FIG. 2) would translate the data from the schema for database 124 into the configuration for application data 140. In this case, interface layer 144 would combine some fields (i.e., first name and last name) and drop other fields (i.e., id, fax) to translate the data into the configuration for application data 140.

However, when application 138 (FIG. 2) is rebased to utilize database 248 to create application 238 (FIG. 3), the schema for database 248 may be substantially different than the schema for database 124. For example, the data in database 248 may be shared among multiple applications 238, 250, 252 (FIG. 3). Applications 250, 252 may have additional functionality that requires a different schema for database 248. As shown, data for the contact is now stored in three different tables 262, 264, 266 in database 248. As a result, new interface layer 246 (FIG. 3) can be implemented to merge the records for a contact from the three tables 262, 264, 266 and present the data to one or more database components in remapped interface layer 244 as a single record containing only the expected fields. Additionally, the schema for database 248 may be substantially different due to different capabilities and benefits from the previous database 124. In order to leverage these capabilities, various changes to the schema may be required.

Figure 5:
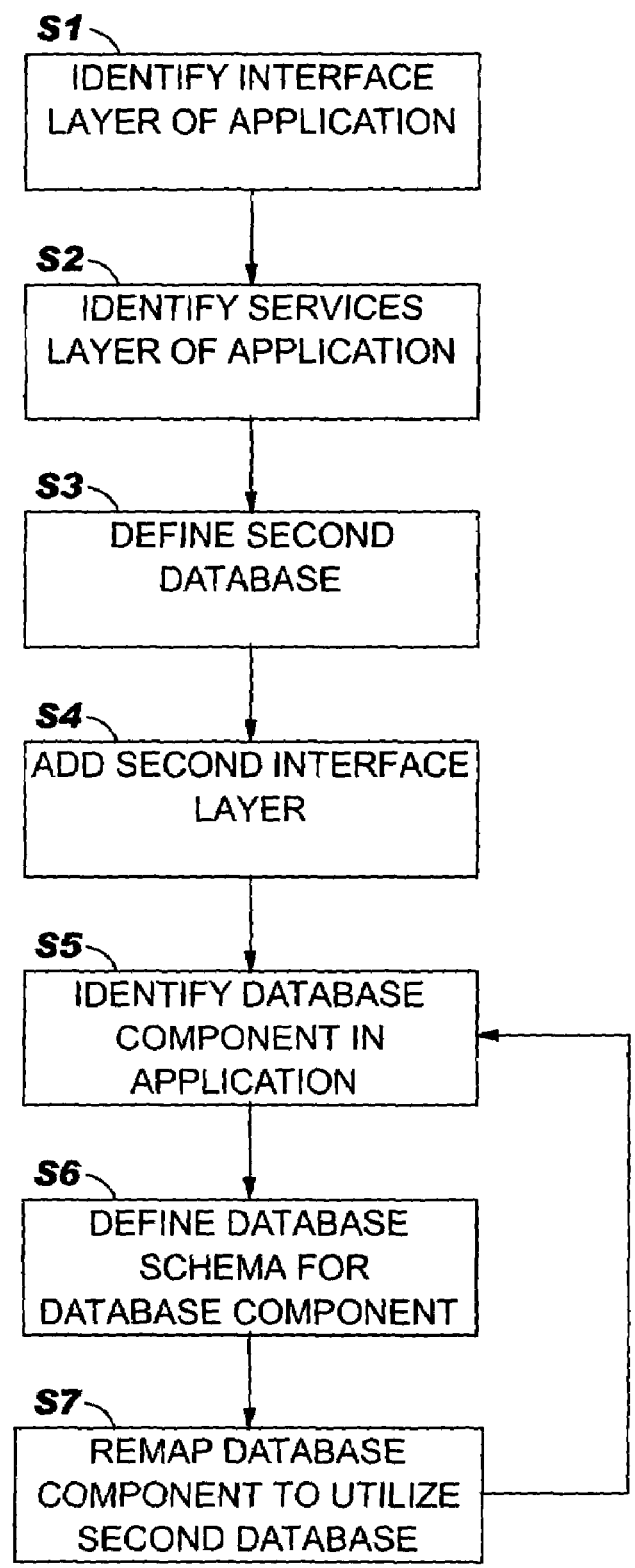
FIG. 5 shows illustrative method steps implementing one aspect of the invention.

FIG. 5 shows illustrative method steps for implementing one embodiment of the invention. In step S1, an interface layer of the application is identified. In step S2, a services layer of the application is also identified. In step S3, a second database for storing data for the application is defined. In step S4, a second interface layer is added to the application. In step S5, a database component is identified in the application. In step S6, a database schema that will be used to store the data related to the database component in the second database is defined. In step S7, the database component is remapped to utilize the second database. In order to utilize the second database, the database component may be remapped to access the second database directly, remapped to utilize the second interface layer in order to access the second database, or some combination of thereof. Steps S5 through S7 can be repeated for each database component that is to be remapped. It is understood that the order and selection of these method steps is only illustrative of the numerous embodiments of the invention. As a result, steps can be performed in a different order, in parallel, combined, and/or removed without departing from the teachings of the invention.

It is understood that all or portions of the present invention can be realized in or carried out with the assistance of hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various embodiments of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of rebasing an application, the method comprising:
    identifying an interface layer of the application that manages application data using a configuration of the application data;
    identifying an interface database component in the interface layer that utilizes a first database that stores the application data;
    identifying a services layer of the application that implements services of the application;
    identifying another database component, wherein the another database component is located in the services layer;
    analyzing the services layer;
    defining a schema for a second database based on requirements of the analyzed services layer;
    defining the second database based on the schema for the second database;
    storing at least some of the application data in the second database; and
    remapping the interface database component to allow management of at least some of the application data in the second database, wherein the remapping comprises rewriting the interface database component or redirecting the interface database component to use the second database wherein the memory configuration of the application data is maintained.

2. The method of claim 1, further comprising rewriting the another database component to allow management of at least some of the application data in the interface layer.

3. The method of claim 1, further comprising remapping the another database component to allow management of at least some of the application data in the second database.

4. The method of claim 1, further comprising:
adding another interface layer that allows management of at least some of the application data in the second database; and
remapping an additional interface database component in the interface layer to allow management of at least some of the application data in the another interface layer.

5. The method of claim 4, wherein the another interface layer includes at least one connection component for managing a connection to the second database.

6. The method of claim 1, wherein programmatic interfaces between the interface layer and the services layer of the application are maintained.

7. The method of claim 1, wherein the first database comprises a proprietary database.

8. A method of rebasing an application, the method comprising:
identifying a first interface layer of the application that manages application data using a configuration of the application data;
identifying an interface database component in the first interface layer that allows management of at least some of the application data in a first database that stores the application data;
identifying a services layer of the application that implements services of the application;
analyzing the services layer;
defining a schema for a second database based on requirements of the analyzed services layer, wherein the second database stores at least some of the application data;
defining the second database based on the schema for the second database;
adding a second interface layer that allows management of at least some of the application data in the second database; and
remapping the interface database component to allow management of at least some of the application data in the second database, wherein the remapping comprises rewriting the interface database component or redirecting the interface database component to use the second database wherein the memory configuration of the application is maintained.

9. The method of claim 8, further comprising identifying another database component, wherein the another database component is located in the services layer.

10. The method of claim 9, further comprising remapping the another database component to allow management of at least some of the application data in at least one of: the second database, the first interface layer, and the second interface layer.

11. The method of claim 8, wherein the second interface layer includes at least one connection component for managing a connection to the second database.

12. The method of claim 9, wherein programmatic interfaces between the first interface layer and the services layer of the application are maintained.

* * * * *